United States Patent Office 3,197,473
Patented July 27, 1965

3,197,473
CARBOXYLIC ACID AMIDES AND METHOD FOR THEIR PREPARATION
Josef Klosa, Berlin-Zehlendorf, Germany, assignor to Messrs. H. Trommsdorff, Aachen, Germany, a company of Germany
No Drawing. Filed Feb. 25, 1963, Ser. No. 260,862
Claims priority, application Germany, Mar. 1, 1962, C 26,394
4 Claims. (Cl. 260—287)

This invention relates to pyridine and quinoline carboxylic acid amides and to a novel method for their preparation, by condensation of pyridine and quinoline carboxylic acids with amines in the presence of polyphosphoric acid.

The invention is concerned with the preparation of pyridine carboxylic acid amides having the formula

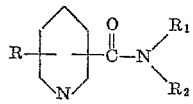

and quinoline carboxylic acid amides having the formula

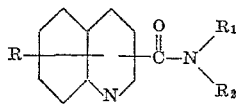

wherein R is a member selected from the group consisting of hydrogen, alkyl of 1 to 2 carbon atoms, alkoxy of 1 to 2 carbon atoms, and phenyl; $R_1$ is a member selected from the group consisting of an alkyl radical, a benzene radical, and a heterocyclic radical; $R_2$ is a member selected from the group consisting of hydrogen and an alkyl radical, and a radical forming a closed heterocyclic nitrogen ring in conjunction with N and $R_1$.

These amides are prepared by condensation of the corresponding pyridine and quinoline carboxylic acids with amines having the formula

wherein $R_1$ and $R_2$ have the significance previously set forth. $NR_1R_2$ can form a closed ring such as piperidine, morpholine, or pyrrolidine.

The carboxylic acid amides of the invention are valuable intermediates in the preparation of drugs and pharmaceuticals having properties resembling those of antipyrine.

As examples of the pyridine carboxylic acids which may be used as starting materials there are listed:

Nicotinic acid (3-pyridine carboxylic acid)
Picolinic acid (2-pyridine carboxylic acid)
Isonicotinic acid (4-pyridine carboxylic acid)
6-methylpicolinic acid (6-methyl-2-pyridine carboxylic acid)

As examples of quinoline carboxylic acids which may be used as starting materials there are listed:

2-phenylquinoline-4-carboxylic acid
2-phenyl-6-methoxyquinoline-4-carboxylic acid In accordance with the invention, there are employed as amines to be condensed with the aforementioned acids, primary aliphatic amines, particularly lower alkyl amines, such as methylamine, ethylamine, and propylamine, and primary arylamines, including amino derivatives of benzene, such as aniline and substituted anilines, for example, 2,6-dimethylaniline, o-, m- or p-chloraniline, o-toluidine, p-toluidine, and p-phenetidine.

There may also be employed secondary amines, such as, for example, diethylamine, dipropylamine, and di-n-amylamine.

An important category of secondary amines is that which contains one or more heterocyclic ring structures. Preferably, there are employed heterocyclic amines which are derivatives of pyrazolone, such as, for example, 1-phenyl-2,3-dimethyl-4-aminopyrazolone-(5),
1-phenyl-2-methyl-3-ethyl-4-amino-pyrazolon-(5),
1-phenyl-2,3-dimethyl-4-methyl-amino-pyrazolon-(5)
and 1-phenyl-2,3-dimethyl-4-benzyl-amino-pyrazolone-(5).

It is already known to produce carboxylic acid amides directly from carboxylic acid and amines. The components are heated together for a long time and the separated water continuously distilled. This process however has considerable disadvantages, such as danger of decomposition, overheating, discoloration, and the like.

For this reason it has already been proposed to use as dehydrating and catalytically acting substances, the acid chlorides of phosphorus, such as phosphorus trichloride, phosphorus oxychloride, or the chlorides of sulphur. This process in fact has certain advantages relative to direct heating of carboxylic acids with amines, the yields being more favorable. In this case also there are encountered numerous technical and preparative deficiencies. Thus, it is necessary to dilute the conversion material with inert diluents. Suitable diluents for this purpose are benzene and toluene. These diluents are inflammable; their use thus demands special apparatus and safety measures. When using acid chlorides of phosphorus or sulphur considerable quantities of volatile hydrohalic acid occur during condensation, which have to be collected and led away. Finally, tough compounds are produced during condensation which damage the stirring mechanisms and largely destroy them.

It has now been found that all these disadvantages may be overcome if pyridine or quinoline carboxylic acids are condensed with amines in the presence of polyphosphoric acid (tetraphosphoric acid).

The amines are mixed with carboxylic acids in molar ratio, employing from 3 to 5 times the quantity of polyphosphoric acid relative to the total conversion compound, and heating is effected to suitable temperatures, expediently between 160°–180° C., but the suitable condensing temperature has to be ascertained for each base. Highly fluid and thoroughly mobile compounds are obtained at 80–100° C. It is not necessary to stir these compounds. The heating lasts 1–3 hours. This compound is absorbed in water neutralized or rendered weakly alkaline with soda, ammonia or diluted alkali. The thus produced amides are obtained in great purity. The yield amounts to 70–95%.

The quantity of polyphosphoric acid used is in no way limited. It may also be used at 10–20 times the quantity relative to the added conversion quantity of carboxylic acid or amine. Instead of the preformed polyphosphoric acid obtainable in commerce, it is also possible to use polyphosphoric acid prepared in situ namely in such a manner that a mixture of orthophosphoric acid with adequate phosphorus pentoxide is taken, so that by heating and stirring the mixture there is obtained a phosphorus pentoxide content of 82–85 percent by weight.

The present process has great technical advantages. These are as follows:

(1) It is possible to proceed directly from carboxylic acid and amines.
(2) The use of inflammable solvents is avoided.
(3) There is avoided the use of substances which attack the apparatus and which are also harmful to health, such as acid chloride of phosphorus and sulphur.

(4) The conversion requires only a few manipulations and is quickly completed.

(5) The process operates very selectively. Only certain carboxylic acids, namely, pyridine and quinoline carboxylic acids, react with amines to give satisfactory yields of amides.

The process in accordance with the invention has a surprising and unexpected effect, since it is known that polyphosphoric acid will ordinarily convert amides, by elimination of water, into nitriles and finally also promotes manifold inner molecular condensations.

How advantageously the process in accordance with the invention operates can be seen from the example for preparation of 4-(pyridine-carboxylic acid amides or alkyl amido)-1-phenyl-2,3 - dimethyl - pyrazolone-(5). These compounds may be produced by converting pyridine-carboxylic acid chlorides with 4-amino-1-phenyl-2,3-dimethyl-pyrazolone-(5) (West German patent specification No. 897,407). The production of pyridine-carboxylic acid halides is extremely inconvenient. Certain simplifications have already been proposed (German patent specification No. 1,046,058). The simplifications concerned however are such which do not avoid the use of pyridine-carboxylic acid chlorides. The process according to the invention overcomes all these difficulties in a simple and technically superior manner, as will be explained below by way of some examples.

*Example 1*

100 g. 4-amino-1-phenyl - 2,3 - dimethyl-pyrazolone-(5) are mixed with 62 g. nicotinic acid. This mixture is charged in portions whilst stirring in 300 g. polyphosphoric acid, which is heated to 100–110° C. The whole lot dissolves.

The thinly liquid melt is heated to 160–180° C. It is left for 1½ to 2 hours at this temperature, allows it to cool off to 100° C. and allows the melt to flow into approximately 0.5 to 1 litre of water. The clear, often yellowy brown colored solution is neutralized with soda. 4-(pyridine-3-carboxylic acid amido) - 2,3 - dimethyl-1-phenyl-pyrazolone-(5) crystallizes out, which is sucked off, washed with water and dried. M.P.: 254–256° C. Yield 135–140 g.

The crystals so obtained are suspended in about 200–300 ml. water, and concentrated hydrochloric acid is added whilst stirring until the crystals are completely dissolved. The brown solution is stirred for 1–2 hours with 20–30 g. decolorizing carbon or left to stand for 3–5 hours with occasional stirring and then filtered. The water-white filtrate is neutralized whilst stirring with a 10–20% soda solution. The amide is precipitated in glittering, purely white crystals. M.P.: 256–258° C. Yield 135–140 g.

*Example 2*

100 g. 4-amino-1-phenyl-2,3-dimethyl-pyrazolone-(5) are mixed with 300 to 400 g. polyphosphoric acid, thoroughly stirred and heated by occasionally stirring to 100–120° C., so that a honey yellow melt is obtained. Now heated for 1–2 hours to 160–180° C., the still hot compound is brought into 1–2 litres of water, so that the whole lot dissolves. If necessary, the reaction mixture is heated to complete the dissolution. Decolorizing carbon is charged into the still warm solution of 50–80° C. It is then stirred for a period of 1–2 hours and subsequently filtered, so that a water-white filtrate is obtained. This filtrate is neutralized with a diluted aqueous ammonia solution. (In this case no extensive heating is to take place.) Then 4-(pyridine-3-carboxylic acid amido)-2,3-dimethyl-1-phenyl-pyrazolone-(5) is precipitated as snow-white glittering crystals which melt sharply at 256–258° C. Further purification is not longer necessary. Yield: 145 g.

Likewise it is possible to produce from:

4-amino-1-phenyl-2,3-dimethyl-pyrazolone-(5) and isonicotinic acid=4-(pyridine-4-carboxylic acid amido)-1-phenyl - 2,3 - dimethylpyrazolone-(5), M.P.: 273–275° C. Yield: 90%, and 2 - methyl-picolinic acid=4-(6-methyl-pyridine-2-carboxylic acid-amido)-1-phenyl-2,3-dimethyl pyrazolone-(5), M.P.: 206–208° C. Yield: 80%, and 2-phenyl-quinoline-4-carboxylic acid=4-(2-phenyl-quinoline-4-carboxylic acid - amido)-1-phenyl-2,3-dimethyl-pyrazolone-(5), M.P.: 245–247° C. Yield: 90%, and 2 - phenyl-6-methoxy-quinoline-4-carboxylic acid=4-(2-phenyl-6-methoxy-quinoline-4-carboxylic acid - amido)-1-phenyl - 2,3 - dimethyl-pyrazolone-(5), M.P.: 282–284° C. Yield: 75%.

Likewise from:

Aniline and nicotinic acid=pyridine-3-carboxylic anilide, M.P.: 118–120° C. Yield: 65%.

p-Phenitidine and nicotinic acid=pyridine-3-carboxylic acid-p-ethoxy anilide, M.P.: 170–172°. Yield: 70%.

Picolinic acid and p-toluidine=picolinic acid-p-toluide, M.P.: 103–105° C. Yield: 70%.

Picolinic acid and o-toluidine=picolinic acid-o-toluide, M.P.: 64–66° C. Yield: 70%.

Isonicotinic acid and diethylamine=isonicotinic acid-diethylamide, M.P.: 23–25° C. Yield: 73%.

What is claimed is:

1. In the method for the preparation of carboxylic acid amides selected from the group consisting of

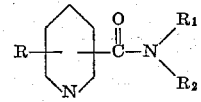

and

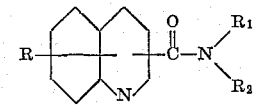

wherein R is a member selected from the group consisting of hydrogen, alkyl of 1 to 2 carbon atoms, alkoxy of 1 to 2 carbon atoms, and phenyl; $R_1$ is a member selected from the group consisting of an alkyl radical, a benzene radical, and a heterocyclic radical; $R_2$ is a member selected from the group consisting of hydrogen and an alkyl radical, and a radical forming a closed heterocyclic nitrogen ring in conjunction with N and $R_1$, the improvement which comprises condensing a carboxylic acid selected from the group consisting of

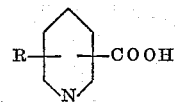

and

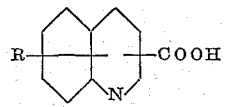

with an amine of the formula

wherein R, $R_1$ and $R_2$ have the foregoing significance, in the presence of polyphosphoric acid.

2. Method according to claim 1 in which the condensation is carried out at a temperature between about 160° and about 180° C.

3. The method which comprises reacting nicotinic acid with 4-amino-1-phenyl-2,3-dimethylpyrazolone in the presence of polyphosphoric acid at a temperature between about 160° C. and about 180° C. to form the corresponding amide.

4. The method which comprises reacting isonicotinic acid with 4-amino-1-phenyl-2,3-dimethylpyrazolone in the presence of polyphosphoric acid at a temperature between about 160° C. and about 180° C. to form the corresponding amide.

References Cited by the Examiner

UNITED STATES PATENTS 2,304,830 12/42 Katzmann _____ 260—295.5
2,985,661 5/61 Hein et al. _____ 260—304

FOREIGN PATENTS 450,051 7/36 Great Britain.

NICHOLAS S. RIZZO, *Primary Examiner.*